(12) United States Patent
Biernat

(10) Patent No.: US 6,474,923 B1
(45) Date of Patent: Nov. 5, 2002

(54) SAMPLE PUSH-OUT FIXTURE

(75) Inventor: John L. Biernat, Scotia, NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/510,345

(22) Filed: Feb. 22, 2000

(51) Int. Cl.[7] ............................................. G21C 19/365
(52) U.S. Cl. ........................................ 414/146; 414/787
(58) Field of Search ................................. 414/146, 404, 414/416.01, 416.04, 416.09, 787; 376/261; 254/1

(56) References Cited

U.S. PATENT DOCUMENTS

| | | | | |
|---|---|---|---|---|
| 3,807,604 A | * | 4/1974 | Schaffer et al. | 222/146.6 |
| 3,907,123 A | * | 9/1975 | Howell | 214/1 BB |
| 4,158,601 A | * | 6/1979 | Gerkey | 176/30 |
| 4,176,499 A | * | 12/1979 | Mazoff | 451/276 |
| 4,445,678 A | * | 5/1984 | George | 269/282 |
| 4,526,311 A | * | 7/1985 | Schroder | 165/11.2 |
| 4,645,639 A | * | 2/1987 | Potter | 376/260 |
| 4,649,016 A | * | 3/1987 | Hardin, Jr. | 376/261 |
| 4,673,545 A | * | 6/1987 | Cooke et al. | 376/261 |
| 4,759,674 A | * | 7/1988 | Schroder et al. | 414/146 |
| 4,803,041 A | * | 2/1989 | Marcon | 376/261 |
| 4,978,495 A | * | 12/1990 | Ahmed | 376/261 |
| 5,415,295 A | * | 5/1995 | Bernardin et al. | 209/587 |
| 5,478,185 A | * | 12/1995 | Kranz | 221/112 |
| 5,559,909 A | * | 9/1996 | Anderson et al. | 385/16 |
| 5,684,628 A | * | 11/1997 | Gerhard | 359/391 |

* cited by examiner

*Primary Examiner*—Kathy Matecki
*Assistant Examiner*—Charles Fox
(74) *Attorney, Agent, or Firm*—Richard A. Morgan; Paul A. Gottlieb

(57) ABSTRACT

This invention generally relates to the remote removal of pelletized samples from cylindrical containment capsules. V-blocks are used to receive the samples and provide guidance to push out rods. Stainless steel liners fit into the v-channels on the v-blocks which permits them to be remotely removed and replaced or cleaned to prevent cross contamination between capsules and samples. A capsule holder securely holds the capsule while allowing manual up/down and in/out movement to align each sample hole with the v-blocks. Both end sections contain identical v-blocks; one that guides the drive out screw and rods or manual push out rods and the other to receive the samples as they are driven out of the capsule.

5 Claims, 3 Drawing Sheets

SAMPLE PUSH-OUT FIXTURE

The present invention was made or conceived in the course of or under a contract with the U.S. Department of Energy.

BACKGROUND OF INVENTION

A controlled method is required for the removal and examination of irradiated pelletized samples from a cylindrical containment capsule ("capsule "). Frequently, the samples are new materials, usually exotic ceramics, which require special handling. The samples are often irradiated in a shielded radioactive facility. During irradiation, the samples are stored in the capsule. Typical capsule configurations have four or more symmetrically spaced cylindrical holes on the same axis as the capsule main body. The samples are stored in the holes during irradiation. At removal, the samples must be removed in a controlled manner to ensure their integrity. Since programs and processes for fabricating irradiated pelletized samples are continually changing, fixtures for removal must be adaptable.

In the past, samples were not handled in a highly controlled manner. For example, the prior art consisted of a fixture that clamped the capsule and used threaded drive screws to push out the pelletized samples. The clamp was stationary and a capsule was removed in order to reposition for removal of sample from a different hole. There were no provisions to orient the drive screws evenly with each sample, nor were there means to capture the pelletized samples upon removal in a secure fashion. Furthermore there were no means to adjust the position of the containment capsule while clamped.

The present invention integrates v-blocks to assure alignment of the push out rods and to securely receive the irradiated samples upon removal. V-block liners are inserted into the channel of each of the v-blocks to ensure cleanliness and orientation. To provide adjustment to the positioning of the containment capsules with the v-blocks, the capsule clamp is mounted on a micrometer slide that provides manual in/out movement and in turn is mounted on a jack that provides manual up/down movement. To take up less space in the facility, the fixture is in three separate pieces and the inherent simplicity of the fixture allows for remote manipulators to operate the sample removal process. The combination of the fixture features provide a controlled and remotely operated manner to remove pelletized samples from cylindrical containment capsules.

SUMMARY OF INVENTION

The design of the present fixture provides a simple and controlled manner to remove irradiated pelletized samples from a cylindrical containment capsule ("capsule "). Prior to sample removal, the capsule is securely held on the fixture. The fixture securely keeps the capsule horizontal using an adjustable hold down clamp. The clamp is on the middle of one of the three fixture sections and is mounted on a manual micrometer translation slide for in/out translation. The translation slide is mounted on a laboratory jack that allows up/down translation. There is enough movement in these two motions to successfully position any capsule hole into push out position without requiring the clamped capsule to be removed, repositioned and re-clamped.

The two end sections contain identical v-blocks; one to guide the drive out screw and rods or manual push out rods and the other to receive the samples as they are driven out of the capsule. There are end blocks on both v-blocks. The rod guide v-block is adjustable to move up to the capsule preventing samples from falling out of other holes. There is a tray under the sample receiving block to catch samples should samples fall out of the v-channel. Stainless steel liners fit into the v-channels on the v-blocks. These can be remotely removed, replaced, and cleansed to prevent cross contamination between capsules or samples.

There are two methods used to advance the push rods in the capsule holes; manually advanced push rods and drive screw advanced push rods. The manually advanced push rods are bent weld rods of various sizes that are grasped by remote manipulators and are used for push out samples that can be easily removed from the holes. The drive screw advanced push rods are used to remove samples that require some controlled force to be removed and consist of a tapered drive screw and stainless steel tubing. The tubing lengths interlock by pins that are fastened in one of each tube that insert into the unpinned end of any tube. The various lengths of tubing allow the use of a single length drive screw by selecting the appropriate tube length.

The novel features of this invention are the removable (cleaned or discarded) stainless steel v-block liners in the v-blocks to keep sample orientation and cleanliness, and also offer a platform to examine samples and rotate them safely. Additionally, the ability to orient the capsule with the v-blocks and the push out rods, allows for sample removal of each sample of a capsule in a secure and controlled manner without requiring the capsule to be removed and re-clamped. The fixture is designed to be easily used by remote manipulators to remove samples and can be disassembled to take up less space.

DETAILED DESCRIPTION

Figure 1:
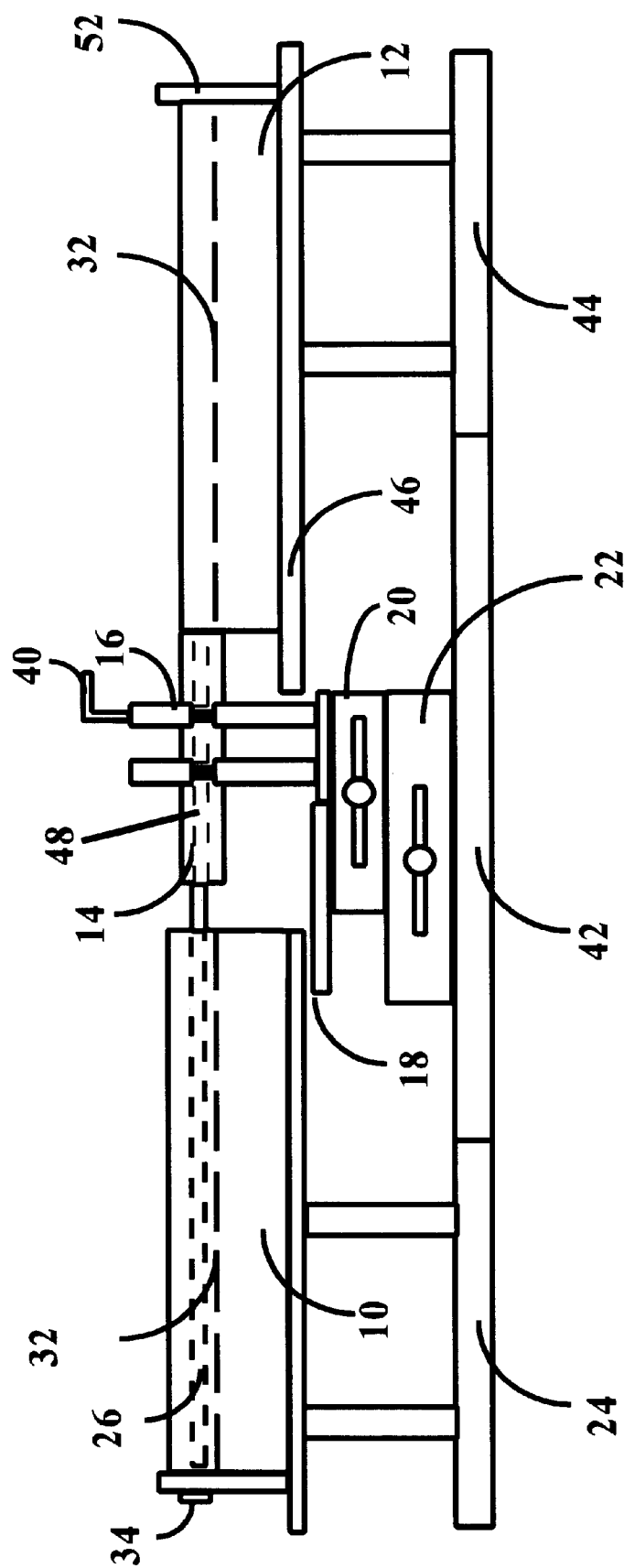
FIG. 1 is a side view of the fixture assembled.

FIG. 1 shows a side view of a push-out fixture. The design of a horizontal translation stage 20 and a laboratory jack 22 are not important for present purposes. It is only necessary that the horizontal translation stage 20 and the laboratory jack 22 fit within the design parameters of the fixture. Most parts of the fixture are made from aluminum for ease of handling and reduced cost to fabricate. Parts that will see hard use or need to be decontaminated are made from stainless steel.

There are three fastening base plates wherein the three main sections are assembled: a rod guide v-block section 24, a capsule clamp and position adjuster section 42, and a sample receiving v-block section 44. The sections are assembled into one unit by fastening the bases together. A capsule clamp 16, the horizontal translation stage 20 and the laboratory jack 22 are positioned so a cylindrical containment capsule 14 can be placed into the capsule clamp 16. The cylindrical containment capsule 14 is positioned vertically by the laboratory jack 22 and horizontally by the horizontal translation stage 20 so that a desired hole 48 of the cylindrical containment capsule 14 is axially aligned with a v-block liner 32. The v-block liner 32 is placed in a push rod v-block 10 and a receiving v-block 12. The v-block liner 32 is flush with both ends of the push rod v-block 10 and the receiving v-block 12. The capsule clamp 16 is loosened by each of the remotely operated lock screws 40 and the cylindrical containment capsule 14 is moved to contact the receiving v-block 12. The clamp 16 is tightened by tightening the remotely operated lock screws 40. All operations can be operated by using remote manipulators.

A tray 18 is attached to the horizontal translation stage 20 to catch any samples or pieces that may fall from the cylindrical containment capsule 14 while inserting a push out rod 26 into the cylindrical containment capsule 14. A sample receiving tray 46 is mounted under the receiving v-block 12 and is used to contain any sample or pieces that may fall from the cylindrical containment capsule 14 when pushing the sample onto the receiving v-block 12. An end block 52 at the end of the receiving v-block 12 prevents the sample from sliding off the receiving v-block 12.

Figure 2:
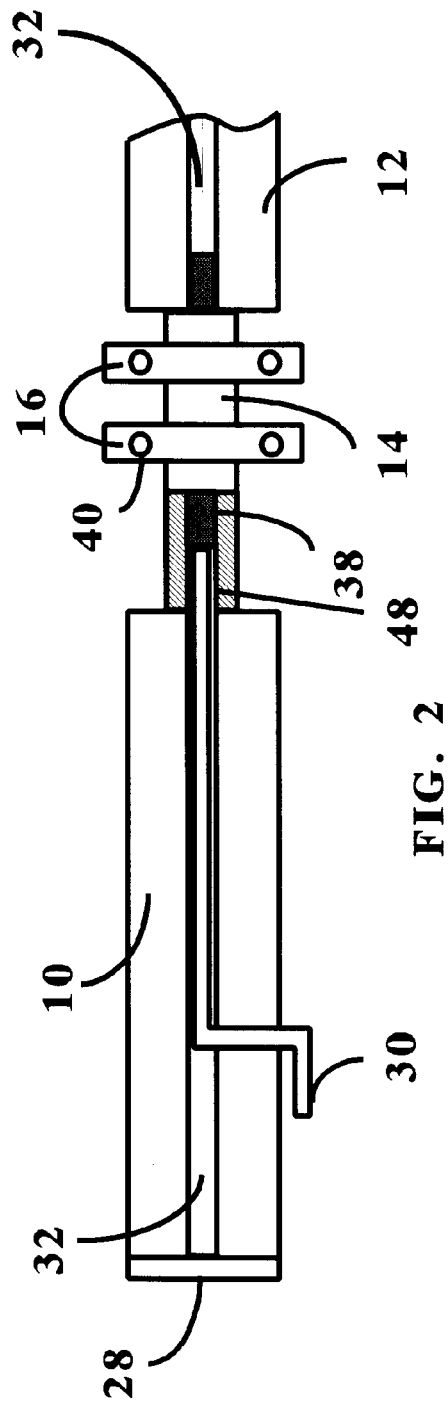
FIG. 2 is a top view of the fixture assembled with the manually advanced push-rod inserted in the push rod v-block.

Reference is now made to FIG. 2 where initially a manually advanced push out rod 30 (preferably stainless steel rods of various diameters) is used. If successful, an irradiated sample 38 is carefully pushed from the desired hole 48 and onto the v-block liner 32 fitted on the receiving v-block 12.

Figure 3:
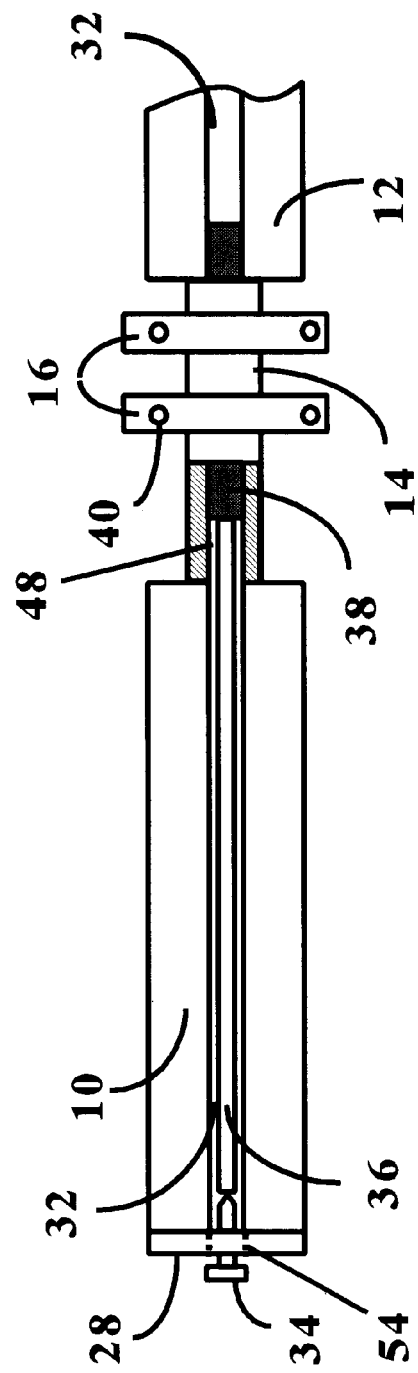
FIG. 3 is a top view of the fixture assembled with the drive screw advanced push-rod inserted in the push-rod v-block.

Reference is now made to FIG. 3 where a drive screw advanced push rod system is used for sample removal when some controlled force is required. An end block 28 at the end of the push rod v-block 10 has a threaded hole 54 for a drive out screw 34. The push out rod 36 consists of various lengths that interlock and have a chamfer that mate to the cone of the drive screw 34. The drive out screw 34 advances the push out rod 36 into the desired hole 48, pushing the irradiated sample 38 onto the v-block liner 32 fitted on the receiving v-block 12.

Figure 4:
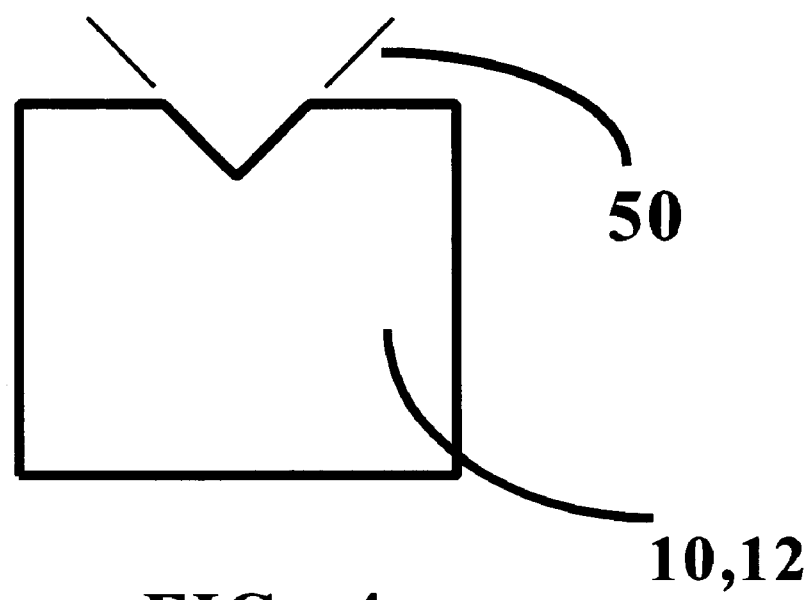
FIG. 4 is a front view of a v-block.

Reference is now made to FIG. 4 wherein both the push rod v-block 10 and the receiving v-block 12 have a v-channel 50 that is at a 90 degree angle.

Figure 5:
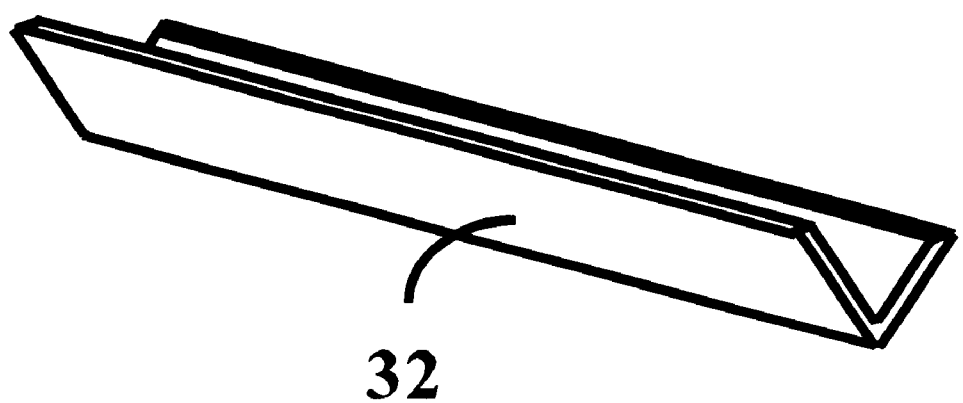
FIG. 5 is a view of the v-block insert.

Reference is now made to FIG. 5 wherein the v-block liner 32 (preferably made from stainless steel), is at a 90 degree angle and made to fit into the v-channel 50 of the push rod v-block 10 and the receiving v-block 12. The v-block liner 32 is the same length as each v-block.

It will be understood that the invention is not to be limited to the details given herein but that it may be modified within the scope of the appended claims.

I claim:

1. A fixture for removing irradiated pellets from a containment capsule, comprising:
   (a) two v-blocks positioned at opposite ends of the fixture, the v-blocks having a 90 degree angle v-channel and v-channel liners,
   (b) a capsule clamp assembly between the two v-blocks, including:
      a capsule clamp,
      a horizontal translation stage, and
      a vertical jack, and
   (c) a push out rod.

2. The fixture of claim 1 wherein one v-block is a rod guide and the other v-block is a pellet receiver.

3. The fixture of claim 1 wherein the push out rod is a, manually advanced push out rod or a drive screw advanced push out rod.

4. The fixture of claim 1 wherein the v-channel liners are removable.

5. The fixture of claim 1 additionally comprising remote manipulators.

\* \* \* \* \*